(12) United States Patent
Schasteen, Jr. et al.

(10) Patent No.: US 11,480,428 B2
(45) Date of Patent: Oct. 25, 2022

(54) METHODS AND SYSTEMS TO TEST A SIZE OR CHARACTERISTIC OF A HOLE

(71) Applicant: The Boeing Company, Chicago, IL (US)

(72) Inventors: William Henry Schasteen, Jr., Chicago, IL (US); Richard John Wichels, Chicago, IL (US)

(73) Assignee: The Boeing Company, Chicago, IL (US)

( * ) Notice: Subject to any disclaimer, the term of this patent is extended or adjusted under 35 U.S.C. 154(b) by 916 days.

(21) Appl. No.: 16/243,164

(22) Filed: Jan. 9, 2019

(65) Prior Publication Data

US 2020/0217653 A1 Jul. 9, 2020

(51) Int. Cl.
*G01B 17/00* (2006.01)
*G01B 5/12* (2006.01)
*G01L 25/00* (2006.01)
*G01P 21/00* (2006.01)

(52) U.S. Cl.
CPC .............. *G01B 17/00* (2013.01); *G01B 5/12* (2013.01); *G01L 25/00* (2013.01); *G01P 21/00* (2013.01)

(58) Field of Classification Search
CPC ...... G01B 5/12; G01B 5/201; G01B 5/08–22; G01B 17/00–08; G01L 25/00–006; G01P 21/00–025

USPC .......................................................... 73/1.08
See application file for complete search history.

(56) References Cited

U.S. PATENT DOCUMENTS 7,707,735 B2 * 5/2010 Wong ..................... G01B 5/245
33/534

FOREIGN PATENT DOCUMENTS

| CA | 1279988 C | * | 2/1991 | ............. G01B 7/023 |
| CN | 104089561 B | * | 8/2016 | |
| JP | H08128815 A | * | 5/1996 | |
| JP | 2003004433 A | * | 1/2003 | |

* cited by examiner

*Primary Examiner* — Marrit Eyassu
(74) *Attorney, Agent, or Firm* — McDonnell Boehnen Hulbert & Berghoff LLP

(57) ABSTRACT

A method to test a size of a hole includes causing a test probe to vibrate and contact multiple portions of an edge of the hole for a testing cycle when the test probe is inserted into the hole, measuring displacement of the test probe, by a sensor coupled to the test probe, as the test probe makes contact with the multiple portions of the edge of the hole, estimating a measurement of the size of the hole based on the displacement of the test probe and reference to calibrated measurements of reference holes, and outputting a notification indicative of an estimation of the measurement.

20 Claims, 9 Drawing Sheets

| Probe Sensor Linearity Measurement | | | | | | | | | | | | |
|---|---|---|---|---|---|---|---|---|---|---|---|---|
| Calibration Hole Actual Values (Inches) | Accelerometer Indications | | | | Diameter Measurement (Best Fit Line) | | | | Regression Residuals (inches) | | | |
| Run | 1 | 2 | 3 | Avg | 1 | 2 | 3 | Avg | 1 | 2 | 3 | Avg |
| 0.325 | 129 | 152 | 146 | 142.33 | 0.324636 | 0.324698 | 0.325558 | 0.324936 | -0.00036 | -0.00030 | 0.00056 | -0.00006 |
| 0.33 | 210 | 216 | 204 | 210.00 | 0.330464 | 0.329629 | 0.329334 | 0.329758 | 0.00046 | -0.00037 | -0.00067 | -0.00024 |
| 0.34998 | 480 | 516 | 523 | 506.33 | 0.349892 | 0.352743 | 0.3501 | 0.350872 | -0.00009 | 0.00276 | 0.00012 | 0.00089 |
| 0.363 | 662 | 622 | 721 | 668.33 | 0.362987 | 0.30691 | 0.362989 | 0.362414 | -0.00001 | -0.00209 | -0.00001 | -0.00059 |

SETTING AN AMPLITUDE OR FREQUENCY OF A DRIVE SIGNAL TO THE TEST PROBE TO CHANGE A PEAK-PEAK DISPLACEMENT OF THE TEST PROBE — 228

FIG. 18

CAUSING THE TEST PROBE TO VIBRATE IN OPEN AIR PRIOR TO INSERTION INTO THE HOLE — 230

MEASURING DISPLACEMENT OF THE TEST PROBE, BY THE SENSOR COUPLED TO THE TEST PROBE, IN THE OPEN AIR TO OBTAIN AN OPEN AIR MEASUREMENT — 232

COMPARING THE OPEN AIR MEASUREMENT TO A STORED OPEN AIR MEASUREMENT — 234

BASED ON A VARIATION OF THE OPEN AIR MEASUREMENT AS COMPARED TO THE STORED OPEN AIR MEASUREMENT BEING OUTSIDE OF A STORED RANGE, OUTPUTTING A NOTIFICATION INDICATIVE OF A PROBLEM WITH THE TEST PROBE — 236

FIG. 19

METHODS AND SYSTEMS TO TEST A SIZE OR CHARACTERISTIC OF A HOLE

FIELD

The present disclosure relates to methods and systems to determine characteristics of a hole, and more particularly, to methods and systems to test a size, diameter, or roundness of a hole.

BACKGROUND

Quick and accurate measurement of diameters and roundness of holes (openings in a workpiece) can be achieved using a variety of tools. Inspection of holes that are drilled into structures can be necessary to confirm that the holes are in compliance with required standards.

An existing tool for inspection includes a blade type gauge. However, such tools tend to experience a high rate of defect due to wear experienced (particularly in the inspection of composite structures).

An existing tool for inspection includes a split ball type probe that is inserted into the hole being measured. As the split ball closes, the ball forces a pin to translate a motion orthogonally up into an indicator that measures displacement. The split probe is first characterized by standard holes to calibrate the probe. However, it has been experienced that the probe is often damaged due to sensitivity to side loading, and it can be difficult to continuously measure roundness of a hole using this tool. Measurement of hole roundness by rotating the probe in the hole risks probe damage and misalignment due to torsional load on the probe. In practice, therefore, the probe is removed, rotated, and re-inserted at another angle to test roundness. This approach may miss some holes that should be rejected. Another issue with this method, particularly in robotic measurement applications, is that the split probe can be susceptible to contamination by wet sealant rendering the split probe less functional for the measurement. In such instances, the probe is usually disassembled and cleaned resulting in down time.

Another existing method uses a blade type GO/NOGO gauge that is inserted into the hole being inspected. The NOGO member must not fit into the hole whereas the GO member must fit. One inspection technique requires the inspector to insert the GO member into the hole, pull it out, rotate it 90 degrees and repeat the measurement. Such a technique can cause excessive wear on the tool when the tool is not fully removed prior to rotation due to use on abrasive composite materials. In addition, use of the GO/NOGO gauges requires a subjective determination that can cause some variation in results based on operator feel.

What is needed is an alternative to the current GO/NOGO gages that can experience a high rate of failure.

SUMMARY

In an example, a method to test a size of a hole is described. The method comprises causing a test probe to vibrate and contact multiple portions of an edge of the hole for a testing cycle when the test probe is inserted into the hole, measuring displacement of the test probe, by a sensor coupled to the test probe, as the test probe makes contact with the multiple portions of the edge of the hole, estimating a measurement of the size of the hole based on the displacement of the test probe and reference to calibrated measurements of reference holes, and outputting a notification indicative of an estimation of the measurement.

In another example, a method to test health of a test probe is described. The method comprises causing a test probe to vibrate in open air, measuring displacement of the test probe, by a sensor coupled to the test probe, in the open air to obtain an open air measurement, comparing the open air measurement to a stored open air measurement, and based on a variation of the open air measurement as compared to the stored open air measurement being outside of a stored range, outputting a notification indicative of a problem with the test probe.

In still another example, a system to test a size of a hole is described. The system comprises a test probe, and a vibration device coupled to the test probe that is configured to vibrate the test probe to cause the test probe to contact multiple portions of an edge of the hole for a testing cycle when the test probe is inserted into the hole. The system also comprises a sensor coupled to the test probe to measure displacement of the test probe as the test probe makes contact with the multiple portions of the edge of the hole, and a computing device having one or more processors and memory storing instructions executable by the one or more processors to perform functions including estimating a measurement of the size of the hole based on the displacement of the test probe and reference to calibrated measurements of reference holes, and outputting a notification indicative of an estimation of the measurement.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings which are not necessarily drawn to scale, wherein:

FIG. 18 shows a flowchart of an example method for use with the method in FIG. 10, according to an example implementation.

FIG. 19 shows a flowchart of an example method for use with the method in FIG. 10, according to an example implementation.

DETAILED DESCRIPTION

Figure 1:
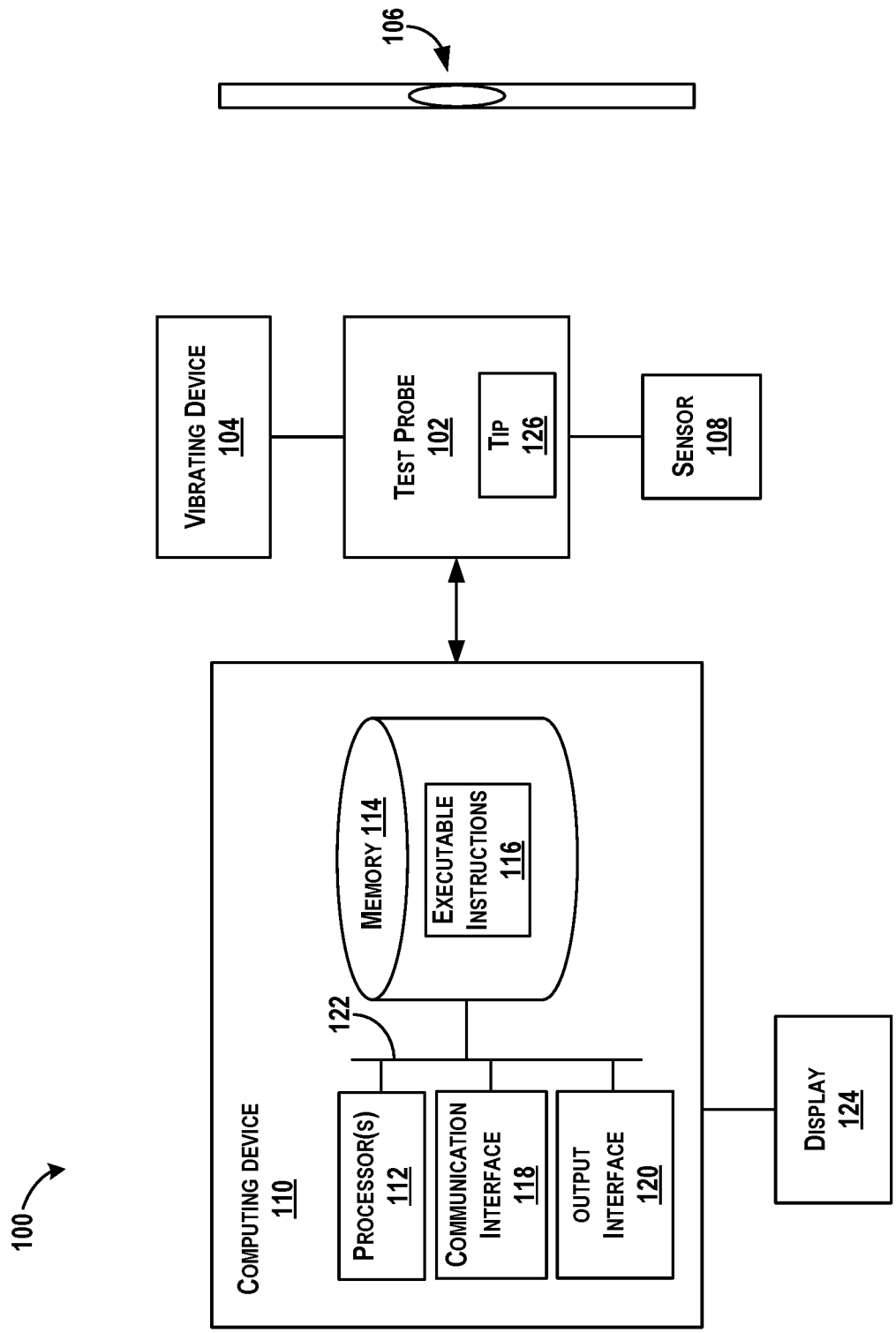
FIG. 1 illustrates an example of a system to test a size of a hole, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for accurately performing inside diameter and roundness measurements on hole artifacts are described, such as holes drilled into structures. One implementation includes a cylindrical probe, which is undersized relative to the hole being measured, is put into a vibration mode that results in a peak to peak displacement of the probe that is larger than a diameter of the hole being measured. When the probe is inserted into the hole, the probe makes contact with walls or edges of the hole during a portion of each vibration cycle. The smaller the hole, the more time that the probe will make contact with the walls of the hole, and consequently, the less amount of time that the probe will be in free vibration.

A force, displacement, or accelerometer sensor can be attached to the probe so that the sensor will produce a root mean square (RMS) output that varies as a function of probe vibration amplitude (e.g., which varies with a size of the hole being measured). For example, the output may vary based on a function of a proportion of time that the probe is in free vibration (not in contact with the artifact being measured) versus time that the probe is in contact with the artifact. Two calibration hole standards of known diameter can be utilized to calibrate an output of the sensor in terms of hole diameter so that the probe can then be used to make measurements on hole artifacts. As a result, an output signal of the probe can be characterized by comparison to known dimensional standards (e.g., hole standards).

Thus, within examples, the probe can accurately measure various dimensional parameters (e.g., hole diameter, gap, etc.) by sensing changes in displacement of the vibrating probe as the probe makes contact with walls of the artifact being measured.

Within examples, the probe does not depend on close tolerance alignment and mechanical actions to translate displacement to an indicator, as required in some existing hole measurement techniques. Variations in a drive signal amplitude or frequency permits precise control of peak-peak displacement of the vibrating probe thereby making the probe customizable to a wide range of tolerance requirements. The probe will be less susceptible to side loading errors due to self-centering effects of probe vibration.

The probe also would not be as susceptible to wear because there is less friction experienced as the probe is inserted or rotated within the artifact being measured. This is due to a clearance fit of the probe being in a non-vibrating mode. As the probe is vibrated, the probe is only making contact with a wall of the hole for a portion of each cycle. Additionally, any wear on the probe may not have as much effect on measurements because the probe can be characterized before use with check standards. The probe has the ability to be rotated inside the hole to obtain a continuous measurement of roundness without creating excessive wear or probe damage. Further, the probe does not rely on operator feel, and should therefore produce more consistent results. From an ergonomic perspective, there would also be less of a repetitive injury risk than exists for existing devices that require force to pull the device out of the hole in tight fits.

Referring now to the figures, FIG. 1 illustrates an example of a system 100 to test a size of a hole, according to an example implementation. The system 100 includes a test probe 102, and a vibration device 104 coupled to the test probe 102 that is configured to vibrate the test probe 102 to cause the test probe 102 to contact multiple portions of an edge of the hole 106 for a testing cycle when the test probe 102 is inserted into the hole 106. The system 100 also includes a sensor 108 coupled to the test probe 102 to measure displacement of the test probe 102 as the test probe 102 makes contact with the multiple portions of the edge of the hole 106, and a computing device 110 having one or more processor(s) 112 and memory 114 storing instructions 116 executable by the one or more processor(s) 112 to perform functions including estimating a measurement of the size of the hole 106 based on the displacement of the test probe 102 and reference to calibrated measurements of reference holes, and outputting a notification indicative of an estimation of the measurement.

In some examples, the computing device 110 a component of the test probe 102 and is included within a housing of the test probe 102. In other examples, as shown in FIG. 1, the computing device 110 is a separate component and is configured to communicate with the test probe 102 either through wired or wireless means. The system 100 and/or the test probe 102 may be a portable device used by operators to make measurements of holes.

The test probe 102 may have a cylindrical design with a tip 126 that is inserted into the hole 106. The tip 126 may have more displacement than other parts of the test probe 102 that is farthest from the hole 106 due to lever action of the vibration. This would create a coin like perimeter that is sensing the 106 hole at the bottom edge of the test probe 102.

In addition to the cylindrical design, other shapes may be incorporated to include a rectangular blade (which would enable finer resolution on roundness measurements), and a tapered tip to allow more clearance for the test probe once the test probe is inserted into the hole 106 (described below in FIG. 4).

The vibration device 104 may include a motor coupled to the test probe 102, or a piezo shaker. The vibration device 104 enables vibration, displacement, or movement of the tip 126 of the test probe 102.

The hole 106 is the artifact being measured in FIG. 1. An type of artifact may be measured in which the artifact has walls or side edges for contact with the tip 126 of the test probe 102.

The sensor 108 may include an accelerometer to sense or measure vibration displacement of the tip 126 of the test probe 102. Other sensor types may be used as well, such as force or displacement sensors. The sensor 108 may be located or positioned anywhere along the test probe 102, although it may be better to position the sensor 108 closer to the tip 126. For a cylindrical probe, the sensor 108 can be positioned inside the tip 126 of the test probe 102.

The computing device 110 may either be directly or indirectly coupled to the test probe 102, such as by using wireless or wired means. The computing device 110 is also shown to include a communication interface 118 and an output interface 120, and all components of the computing device 110 are each connected to a communication bus 122. The computing device 110 may also include hardware to enable communication within the computing device 110 and between the computing device 110 and other devices (not shown). The hardware may include transmitters, receivers, and antennas, for example.

The communication interface 118 may be a wireless interface and/or one or more wireline interfaces. The communication interface 118 allows for both short-range communication and long-range communication to one or more networks or to one or more remote devices.

Figure 2:
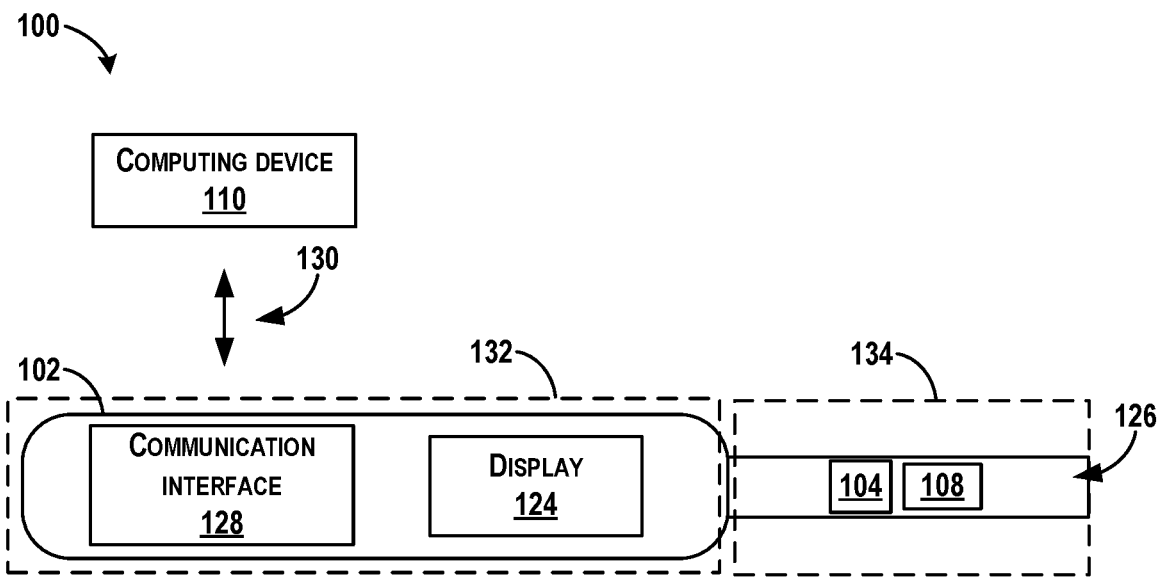
FIG. 2 illustrates an example of the system in which the computing device is separate from the test probe, according to an example implementation.

FIG. 2 illustrates an example of the system 100 in which the computing device 110 is separate from the test probe 102, according to an example implementation. As shown, the test probe 102 may also include a communication interface 128 enabling communication over link 130 using wireless communication techniques (e.g., Bluetooth or over WiFi) with the computing device 110. In FIG. 2, the test probe 102 is shown to include a distal portion 132 (e.g., handle) and a proximal portion 134 (including the tip 126). The vibration device 104 and the sensor 108 are included in the proximal portion 134, and in use, the vibration device 104 causes the proximal portion to vibrate.

Figure 3:
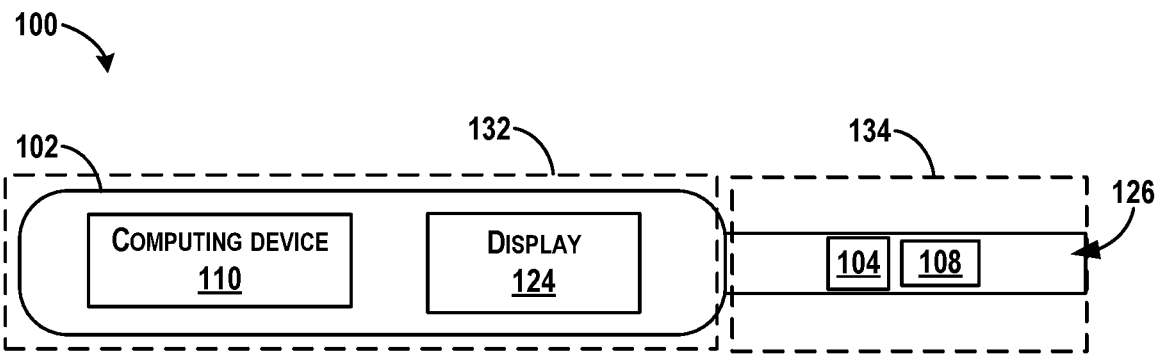
FIG. 3 illustrates another example of the system in which the computing device is included within the test probe, according to an example implementation.

FIG. 3 illustrates another example of the system 100 in which the computing device 110 is included within the test probe 102, according to an example implementation. As shown, the computing device 110 is included in the distal portion 132 (e.g., handle).

Figure 4:
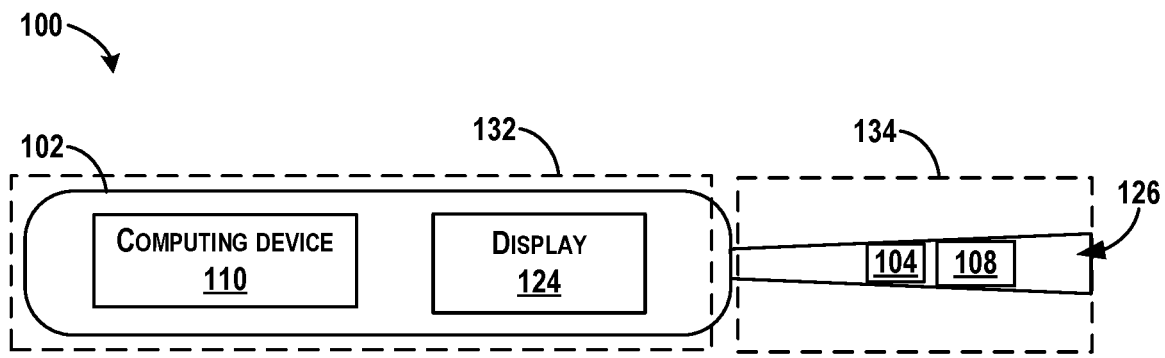
FIG. 4 illustrates another example of the system in which the tip is a tapered tip, according to an example implementation.

FIG. 4 illustrates another example of the system 100 in which the tip 126 is a tapered tip, as described above, according to an example implementation. The tip 126 may taper to be narrower toward the distal portion 132 of the test probe 102. The tapered probe tip design is an option to insure that only the tip 126 of the test probe 102 makes contact because the proximal portion 134 is physically wider by a small amount at an end of the tip 126.

Referring back to FIG. 1, the memory 114 may include or take the form of one or more computer-readable memory or computer readable storage media that can be read or accessed by the processor(s) 112. The computer-readable storage media can include volatile and/or non-volatile storage components, such as optical, magnetic, organic or other memory or disc storage, which can be integrated in whole or in part with the processor(s) 112. The memory 114 is considered non-transitory computer readable memory or non-transitory computer readable media. In some examples, the memory 114 can be implemented using a single physical device (e.g., one optical, magnetic, organic or other memory or disc storage unit), while in other examples, the memory 114 can be implemented using two or more physical devices.

The memory 114 thus is a non-transitory computer readable memory, and the instructions 116 are stored thereon. The instructions 116 include computer executable code. When the instructions 116 are executed by the processor(s) 112, the processor(s) 112 are caused to perform functions of the computing device 110.

The processor(s) 112 may be a general-purpose processor or a special purpose processor (e.g., digital signal processors, application specific integrated circuits, etc.). The processor(s) 112 may receive inputs from the communication interface 118 (e.g., as received from the test probe 102), and process the inputs to generate outputs that are stored in the memory 114 and output via the output interface 120, such as to send the outputs to a display 124 or to the test probe 102. Thus, the output interface 120 may be similar to the communication interface 118 and can be a wireless interface (e.g., transmitter) or a wired interface as well. The display 124 is thus coupled to the computing device 110, and the display 124 receives the notification and displays information of the notification.

As mentioned, the memory 114 has stored therein instructions 116, that when executed by the processor(s) 112, causes the processor(s) 112 to perform functions for causing the test probe 102 to vibrate and contact multiple portions of an edge of the hole 106 for a testing cycle when the test probe 102 is inserted into the hole 106, receiving an output of the sensor 108 that measures displacement of the test probe 102 as the test probe 102 makes contact with the multiple portions of the edge of the hole 106, estimating a measurement of the size of the hole 106 based on the displacement of the test probe 102 and reference to calibrated measurements of reference holes, and outputting a notification indicative of an estimation of the measurement.

Figure 5:
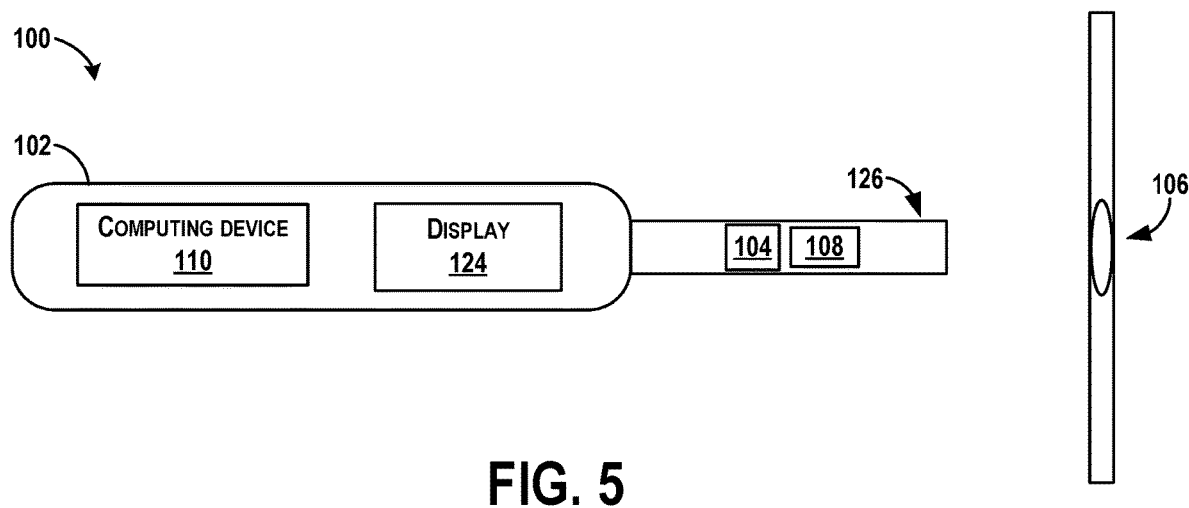
FIG. 5 illustrates an example of use of the system to measure a size of the hole, according to an example implementation.

FIG. 5 illustrates an example of use of the system 100 to measure a size of the hole 106, according to an example implementation. In some examples, to achieve this operation, functions include inserting the tip 126 of the test probe 102 into the hole 106, and causing the tip 126 to vibrate via the vibration device 104. The hole 106 is generally considered to have one continuous edge, and as the tip 126 vibrates, the tip 126 contacts multiple portions of the edge of the hole 106. In some examples, the test probe 102 can be caused to rotate as the test probe 102 vibrates and contacts multiple portions of the edge of the hole 106 for the testing cycle when the test probe is 102 inserted into the hole. An amplitude or frequency of a drive signal for the vibration device 104 can be set to change a peak-peak displacement of the test probe 102.

As described, the tip 126 contacts multiple portions of the hole, however, generally only one area of the tip 126 makes contact. For instance, a bottom portion of the tip 126 will contact the hole because that portion has a largest displacement due to probe movement being "hinged" at a point where the vibration mechanism is attached. In this way, the test probe 102 will not be making contact with the entire depth of the hole at the same time, but rather, at a depth into the hole at which the tip 126 is positioned. It is thus possible to determine differences in diameter that may occur at different depths in the hole.

Figure 6:
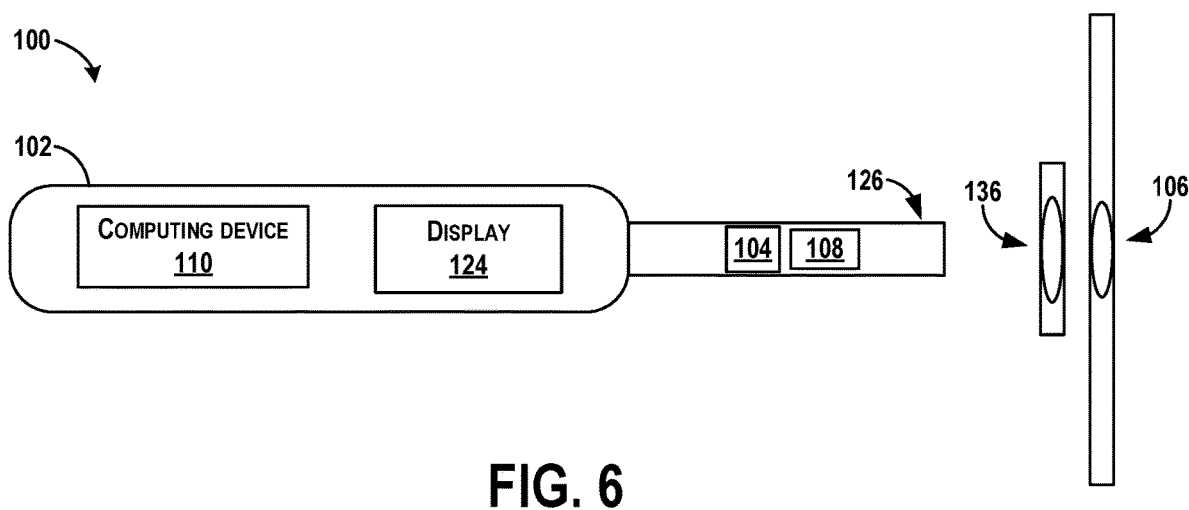
FIG. 6 illustrates another example of use of the system to measure a size of the hole, according to an example implementation.

FIG. 6 illustrates another example of use of the system 100 to measure a size of the hole 106, according to an example implementation. In some examples, a check hole device 136 is positioned in line with the hole 106 under test, and the test probe 102 is inserted through the check hole device 136 and the tip 126 (e.g., tapered tip) reaches the hole 106 under test. Following, functions include causing the tip 126 to vibrate via the vibration device 104, determining a check measurement of the check hole device 136 based on outputs of the sensor 108, and based on the check measurement exceeding a specified threshold, outputting a notification indicative of a requirement for a recalibration of the test probe 102.

Detailed operation of the use of the system 100 to measure a size of the hole 106 is now described. In one example, the sensor 108 includes an accelerometer, and the output of the sensor includes a root mean square (RMS) signal that is a function of a proportion of time that the test probe 102 is in free vibration versus a proportion of time that the test probe 102 is in contact with the multiple portions of the edge of the hole 106. Thus, by measuring changes in acceleration of the test probe 102, contact with the multiple portions of the hole 106 can be determined.

In another example, the sensor 108 includes a force sensor, and by measuring changes in applied force of the test probe 102, contact with the multiple portions of the hole 106 can be determined.

Thus, measuring the displacement of the test probe 102 can include detecting peak-peak displacement of the test probe 102 using the sensor 108 that is attached to the test probe 102.

Figure 7:
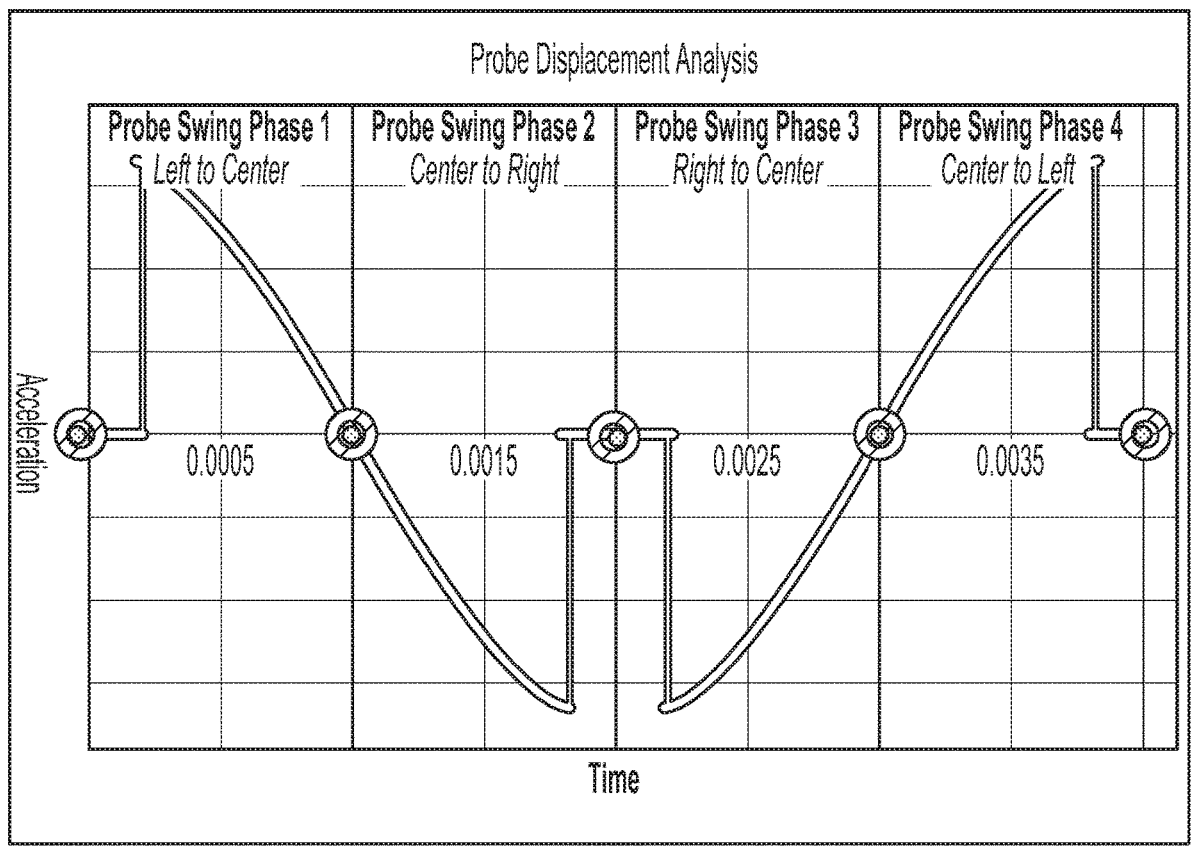
FIG. 7 is a graph illustrating example changes in acceleration of the tip of the test probe during testing of the size of the hole, according to an example implementation.

FIG. 7 is a graph illustrating example changes in acceleration of the tip 126 of the test probe 102 during testing of the size of the hole 106, according to an example implementation. The graph in FIG. 7 includes acceleration on the y-axis and time on the x-axis. Initially, with the test probe 102 outside of the hole and not vibrating, acceleration will be zero or approximately zero, and the RMS output is also zero or approximately zero. Once the vibration device 104 starts to vibrate the test probe 102 with the test probe 102 still outside the hole, the RMS output is a maximum and acceleration is a sin-wave as the tip 126 vibrates back and forth so as to constantly stop-and-go causing acceleration to decrease and increase over time.

Once the test probe 102 is inserted into the hole 106 and contacts an edge of the hole 106, acceleration goes to zero or approximately zero. This is shown in the graph of FIG. 7 at five separate data points along the x-axis where acceleration is zero. Acceleration is zero because at the instantaneous point in time, the tip 126 is not moving during contact with the wall of the hole 106. Thus, as shown in FIG. 7, as the tip 126 swings from left to center (phase 1), the acceleration decreases to zero, and then as the tip 126 swings from center to right (phase 2), the acceleration magnitude increases until the tip 126 contacts the wall at which time the acceleration returns to zero. Following, as the tip 126 swings from right to center (phase 3), the acceleration increases in magnitude until the tip 126 contacts the wall again at which time the acceleration returns to zero. Lastly, as the tip 126 swings from center to left (phase 4), the acceleration increases in magnitude until the tip 126 contacts the wall again at which time the acceleration returns to zero.

Time during which the magnitude of the acceleration is increasing or decreasing may be considered free probe time in which the tip 126 of the test probe 102 is not in contact with the wall of the hole 106. Time during which the acceleration is zero may be considered bound probe time because the tip 126 of the test probe 102 is in contact with the wall of the hole 106.

The graph shown in FIG. 7 is conceptual, and in practice, waveforms may not exhibit abrupt drops to zero when the test probe 102 makes contact with an edge, but rather, the waveform can exhibit changes to have a lot of high frequency content. Also, immediately when the test probe 102 strikes the edge of the hole, there can be an impulse spike that is not shown in the graph in FIG. 7. Because of the spike, open air readings can be lower than the measurements inside the hole because there is no impulse spike in the open air measurement. Thus, the graph in FIG. 7 illustrates conceptual operation of motion of the test probe 102 in an idealistic manner to illustrate operation of the test probe 102.

A primary mode of operation includes an approximate single axis of vibration of the test probe 102. However, other examples, can implement multiple axes of vibration that permit roundness measurement without a need to rotate the test probe 102 or hole artifact.

Outputs of the sensor 108 are taken constantly (or output according to a duty cycle of the sensor 108) during the testing cycle, and the outputs are compared against values of sensor outputs for known holes sizes. In this way, the outputs are characterized based on using outputs of holes that have known diameters.

In other examples, the test probe 102 may be used to measure displacement of the test probe 102 for the testing cycle within at least two holes having known diameter, and a relationship between outputs of the sensor 108 and diameter of the at least two holes is generated. Then, the measurement of the size of the hole 106 under test is estimated based on the output of the sensor 108 and reference to calibrated measurements of reference holes. This includes characterizing the output of the sensor 108 in terms of a diameter of the hole via interpolation using the relationship between outputs of the sensor 108 and diameter of the at least two holes Calibrated data can thus include output values of the sensor 108 that are associated with diameters of holes, or roundness values of holes, for example. Then, a comparison of the output of the sensor 108 can be made to estimate the diameter or roundness of the hole 106 under test.

An output of the testing includes a notification, which may be an actual measurement value (e.g., 0.25042 inches) of a diameter of the hole, or a Pass/Fail indication of hole size based on product specifications. Thus, the notification can indicate whether the size of the hole 106 is in compliance with a hole size requirement, whether a roundness of the hole 106 is in compliance with a hole size requirement, a value of a diameter of the hole 106, or a value of a roundness of the hole 106.

An additional example use of operation of the system 100 includes to monitor health of a measurement process including using trends in open air measurements (e.g., the RMS output of the test probe 102 when the test probe 102 is in vibration but not placed inside a hole 106). The open air measurement serves to ascertain a health of the test probe 102 and measurement system. For example, a hardware failure or presence of contamination on the test probe 102 (e.g., such as wet sealant) can cause outputs of the sensor 108 to vary, which requires cleaning of the test probe 102.

Thus, some example uses of the system 100 include causing the test probe 102 to vibrate in open air prior to insertion into the hole 106, measuring displacement of the test probe 102 in the open air to obtain an open air measurement, comparing the open air measurement to a stored open air measurement, and based on a variation of the open air measurement as compared to the stored open air measurement being outside of a stored range, outputting a notification indicative of a problem with the test probe.

Further, integration of the check hole device 136 that is placed in-line with the hole 106 being measured, such that the test probe 102 passes through the check hole device 136 while making a measurement enables additional detection of deformation and wear or calibration drift. If the check measurement error exceeds a specified threshold, the test probe 102 will prompt the user (or robot) to perform a new calibration with the certified or nominal hole standards.

Figures 8, 9:
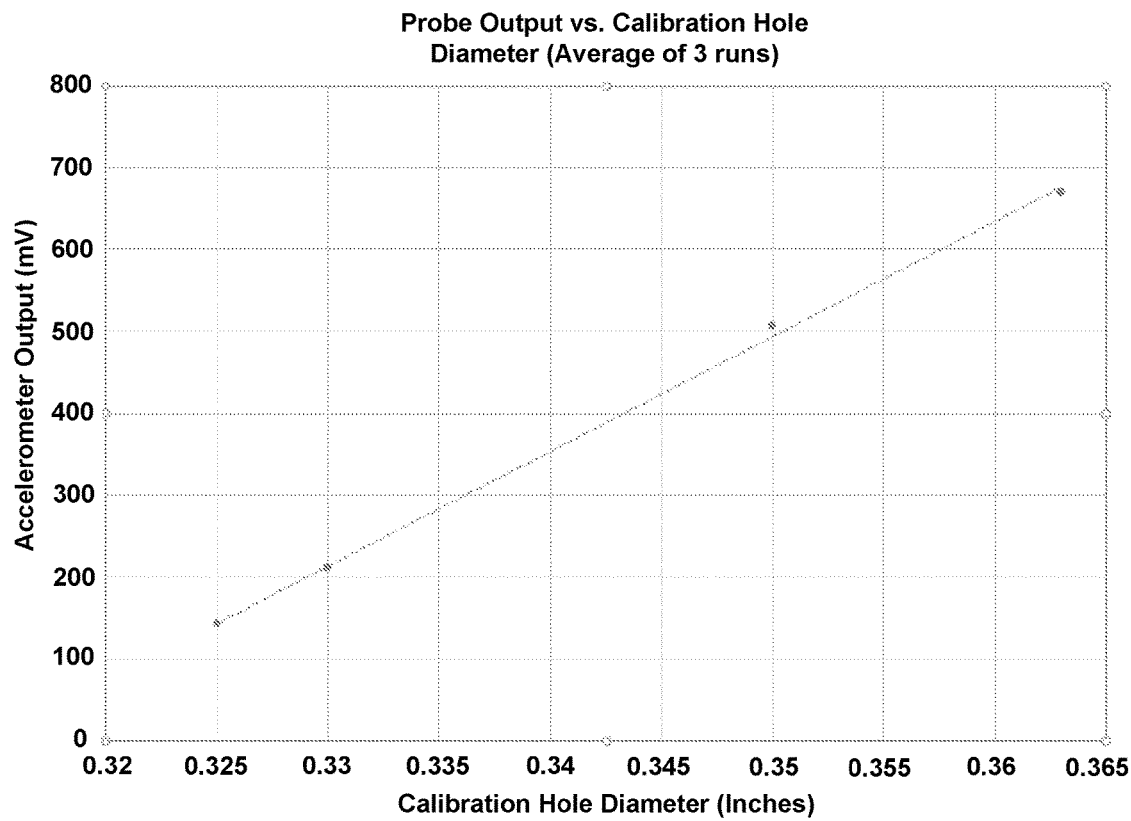
FIG. 8 illustrates a table of outputs of the sensor obtained with the system shown in FIG. 1, according to an example implementation.
FIG. 9 illustrates an example of a graph of accelerometer output (mV) on the y-axis versus calibration hole diameter (inches) on the x-axis, according to an example implementation.

FIG. 8 illustrates a table of outputs of the sensor 108 obtained with the system 100 shown in FIG. 1, according to an example implementation. For each measurement, a tilt of the test probe 102 was adjusted to obtain a maximum meter indication.

If the smallest and largest diameter holes are treated as calibration standards and the two middle sized holes are treated as unknown product holes, then the measurement would have yielded the following errors.

| | Delta from Nominal Hole Size (Inches) | | | |
|---|---|---|---|---|
| Actual Size | Run 1 | Run 2 | Run 3 | Avg |
| 0.33 | 0.0008 | 0.0002 | −0.0012 | −0.0001 |
| 0.34998 | 0.0000 | 0.0044 | −0.0001 | 0.0013 |

The data indicates that the system 100 works well for accurate hole diameter measurement.

FIG. 9 illustrates an example of a graph of accelerometer output (mV) on the y-axis versus calibration hole diameter (inches) on the x-axis, according to an example implementation. As shown, the accelerometer output increases approximately linearly as the diameter of the hole increases. An output of the sensor 108 of the test probe 102 can then be mapped to the graph, and/or the slope of the graph can be used to interpolate or map the output of the sensor 108 to a diameter determine measurement.

Figure 10:
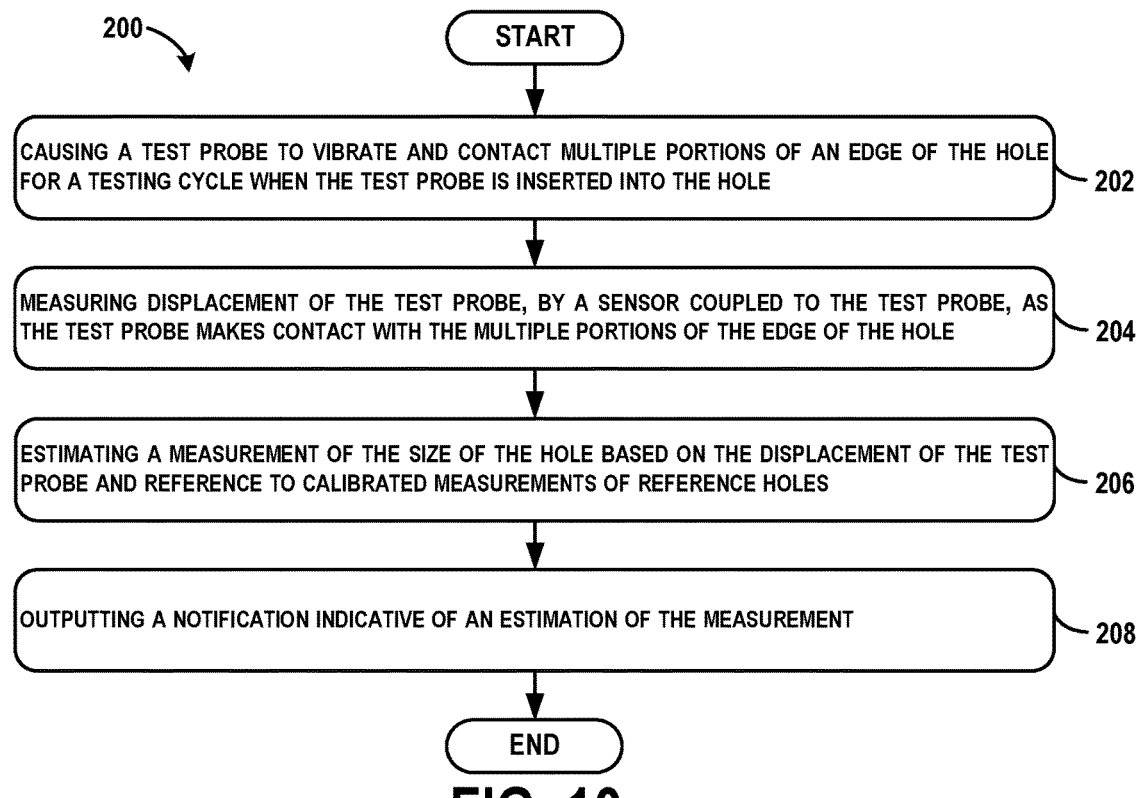
FIG. 10 shows a flowchart of an example of a method to test a size of the hole, according to an example implementation.

FIG. 10 shows a flowchart of an example of a method 200 to test a size of the hole 106, according to an example implementation. Method 200 shown in FIG. 10 presents an example of a method that could be used with the system 100 shown in FIG. 1 or with components of the system 100, for example. Further, devices or systems may be used or configured to perform logical functions presented in FIG. 10. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, some or each block or portions of some or each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 10, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes causing the test probe 102 to vibrate and contact multiple portions of an edge of the hole 106 for a testing cycle when the test probe 102 is inserted into the hole 106. At block 204, the method 200 includes measuring displacement of the test probe 102, by the sensor 108 coupled to the test probe 102, as the test probe 102 makes contact with the multiple portions of the edge of the hole 106. At block 206, the method 200 includes estimating a measurement of the size of the hole 106 based on the displacement of the test probe 102 and reference to calibrated measurements of reference holes. At block 208, the method 200 includes outputting a notification indicative of an estimation of the measurement.

Figure 11:
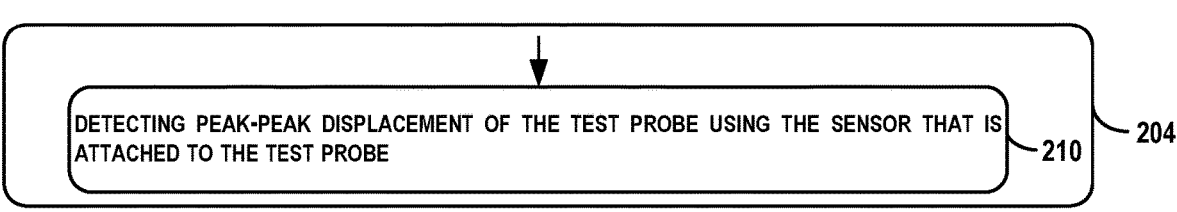
FIG. 11 shows a flowchart of an example method for measuring the displacement of the test probe as shown in FIG. 10, according to an example implementation.

FIG. 11 shows a flowchart of an example method for measuring the displacement of the test probe 102 as shown in block 204 of FIG. 10, according to an example implementation. At block 210, functions include detecting peak-peak displacement of the test probe 102 using the sensor 108 that is attached to the test probe 102.

Figure 12:
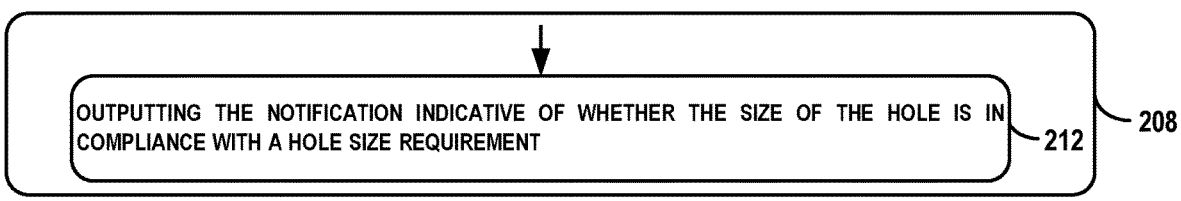
FIG. 12 shows a flowchart of an example method for outputting the notification indicative of the estimation of the measurement as shown in FIG. 10, according to an example implementation.

FIG. 12 shows a flowchart of an example method for outputting the notification indicative of the estimation of the measurement as shown in block 208 of FIG. 10, according to an example implementation. At block 212, functions include outputting the notification indicative of whether the size of the hole 106 is in compliance with a hole size requirement.

Figure 13:
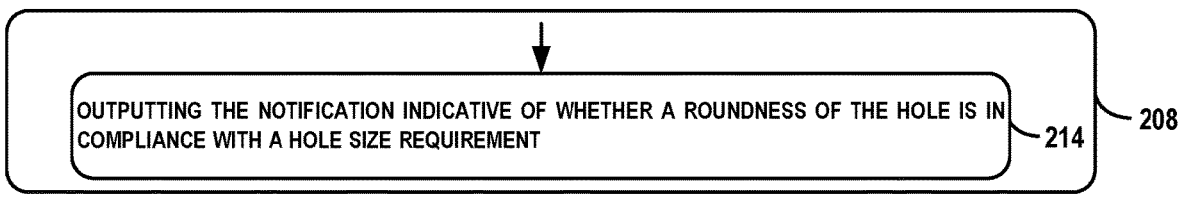
FIG. 13 shows a flowchart of an example method for outputting the notification indicative of the estimation of the measurement as shown in FIG. 10, according to an example implementation.

FIG. 13 shows a flowchart of an example method for outputting the notification indicative of the estimation of the measurement as shown in block 208 of FIG. 10, according to an example implementation. At block 214, functions include outputting the notification indicative of whether a roundness of the hole 106 is in compliance with a hole size requirement.

Figure 14:
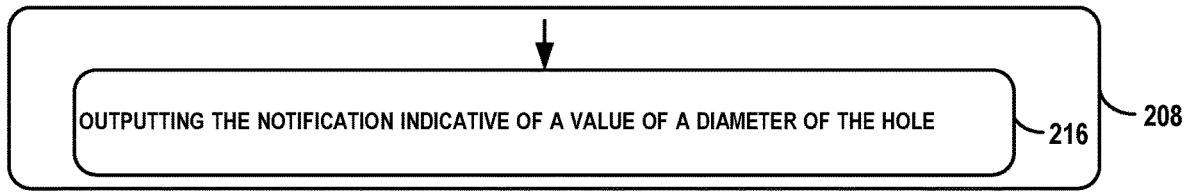
FIG. 14 shows a flowchart of an example method for outputting the notification indicative of the estimation of the measurement as shown in FIG. 10, according to an example implementation.

FIG. 14 shows a flowchart of an example method for outputting the notification indicative of the estimation of the measurement as shown in block 208 of FIG. 10, according to an example implementation. At block 216, functions include outputting the notification indicative of a value of a diameter of the hole 106.

Figure 15:
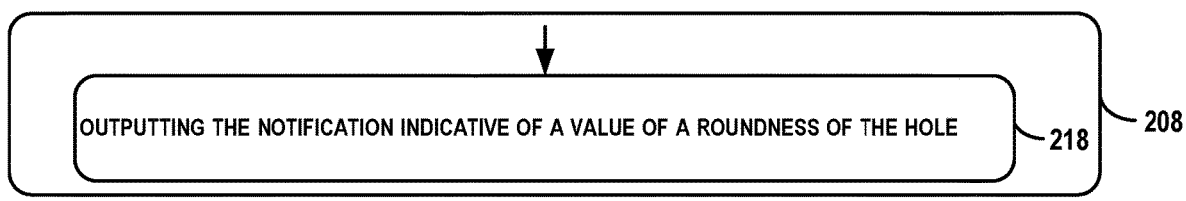
FIG. 15 shows a flowchart of an example method for outputting the notification indicative of the estimation of the measurement as shown in FIG. 10, according to an example implementation.

FIG. 15 shows a flowchart of an example method for outputting the notification indicative of the estimation of the measurement as shown in block 208 of FIG. 10, according to an example implementation. At block 218, functions include outputting the notification indicative of a value of a roundness of the hole 106.

Figure 16:
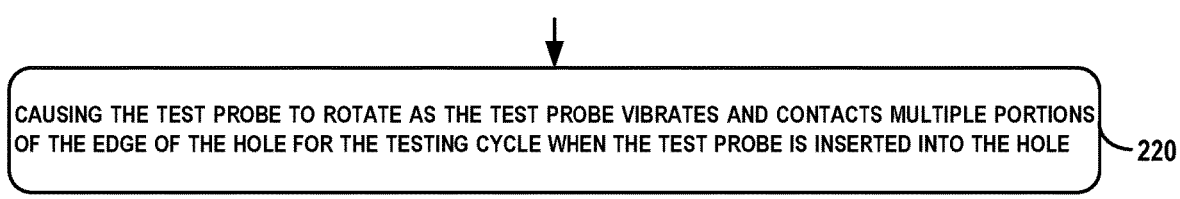
FIG. 16 shows a flowchart of an example method for use with the method in FIG. 10, according to an example implementation.

FIG. 16 shows a flowchart of an example method for use with the method 200 in FIG. 10, according to an example implementation. At block 220, functions include causing the test probe 102 to rotate as the test probe 102 vibrates and contacts multiple portions of the edge of the hole 106 for the testing cycle when the test probe 102 is inserted into the hole 106.

Figure 17:
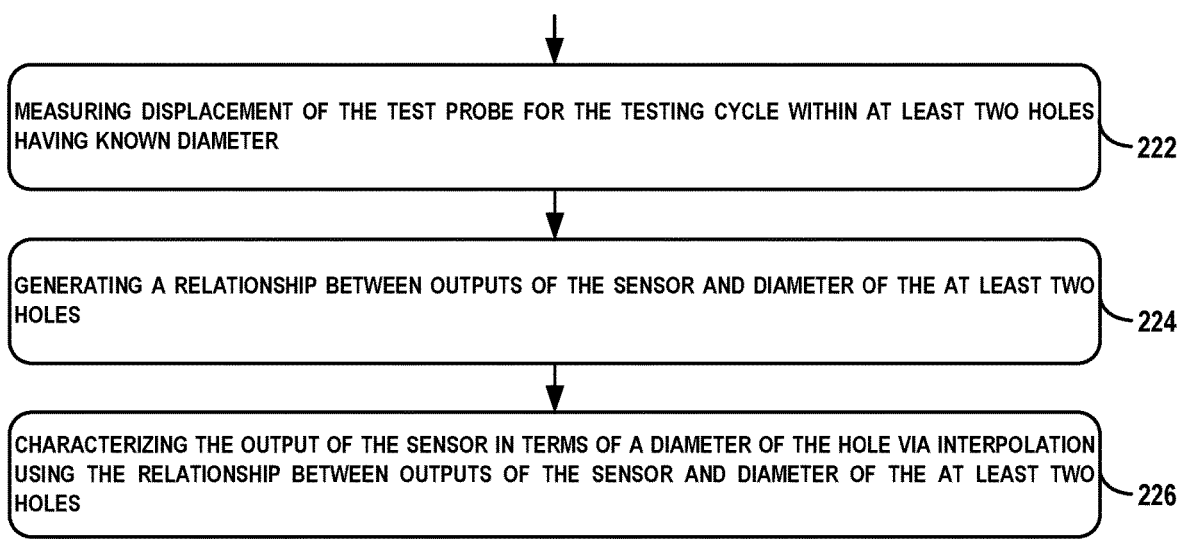
FIG. 17 shows a flowchart of an example method for use with the method in FIG. 10, according to an example implementation.

FIG. 17 shows a flowchart of an example method for use with the method 200 in FIG. 10, according to an example implementation. At block 222, functions include measuring displacement of the test probe 102 for the testing cycle within at least two holes having known diameter. At block 224 generating a relationship between outputs of the sensor 108 and diameter of the at least two holes. At block 226 estimating the measurement of the size of the hole 106 based on the output of the sensor 108 and reference to calibrated measurements of reference holes comprises characterizing the output of the sensor 108 in terms of a diameter of the hole 106 via interpolation using the relationship between outputs of the sensor 108 and diameter of the at least two holes (e.g., as shown in the graph of FIG. 9).

FIG. 18 shows a flowchart of an example method for use with the method 200 in FIG. 10, according to an example implementation. At block 228, functions include setting an amplitude or frequency of a drive signal to the test probe 102 to change a peak-peak displacement of the test probe 102.

FIG. 19 shows a flowchart of an example method for use with the method 200 in FIG. 10, according to an example implementation. At block 230, functions include causing the test probe 102 to vibrate in open air prior to insertion into the hole 106. At block 232, functions include measuring displacement of the test probe 102, by the sensor 108 coupled to the test probe 102, in the open air to obtain an open air measurement. At block 234, functions include comparing the open air measurement to a stored open air measurement. At block 236, functions include based on a variation of the open air measurement as compared to the stored open air measurement being outside of a stored range, outputting a notification indicative of a problem with the test probe 102.

Figure 20:
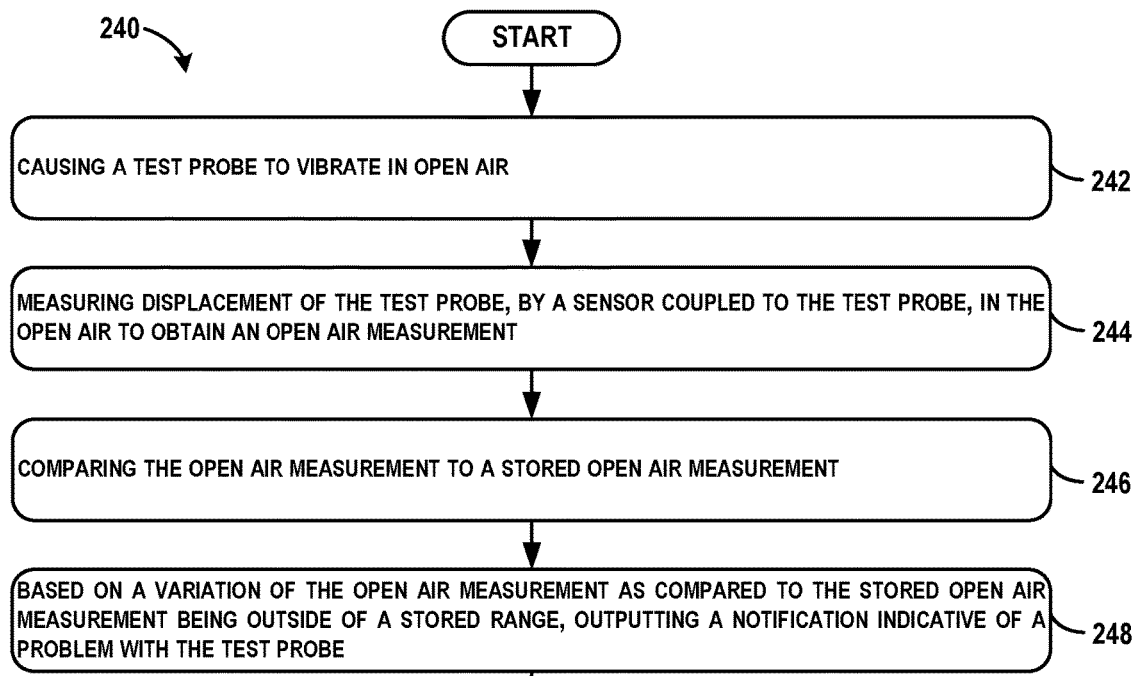
FIG. 20 shows a flowchart of an example of a method to test health of a test probe, according to an example implementation.

FIG. 20 shows a flowchart of an example of a method 240 to test health of a test probe 102, according to an example implementation. At block 242, the method 240 includes causing the test probe 102 to vibrate in open air. At block 244, the method 240 includes measuring displacement of the test probe 102, by the sensor 108 coupled to the test probe 102, in the open air to obtain an open air measurement. At block 246, the method 240 includes comparing the open air measurement to a stored open air measurement. At block 248, the method 240 includes based on a variation of the open air measurement as compared to the stored open air measurement being outside of a stored range, outputting a notification indicative of a problem with the test probe 102.

Figure 21:
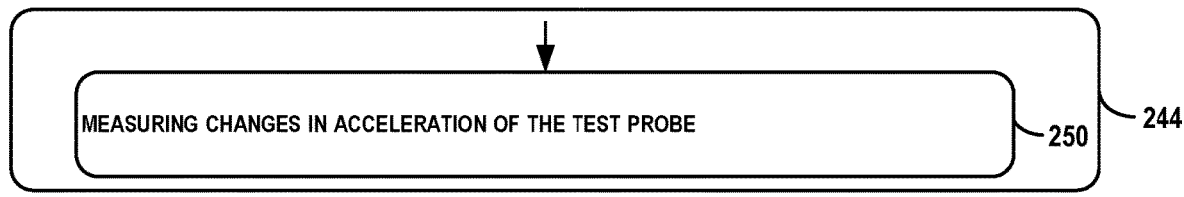
FIG. 21 shows a flowchart of an example method for measuring displacement of the test probe, as shown in FIG. 20, according to an example implementation.

FIG. 21 shows a flowchart of an example method for measuring displacement of the test probe 102, as shown in block 244 of FIG. 20, according to an example implementation. At block 250, functions include measuring changes in acceleration of the test probe 102.

Figure 22:
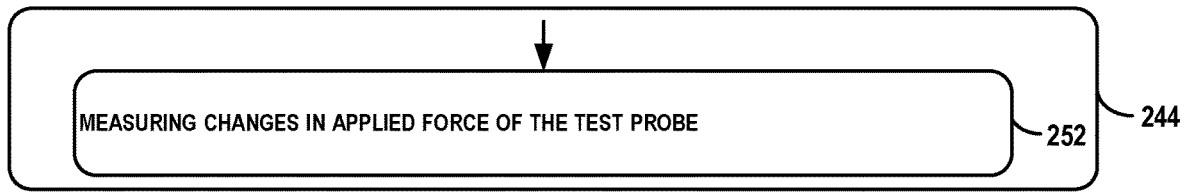
FIG. 22 shows a flowchart of an example method for measuring displacement of the test probe, as shown in FIG. 20, according to an example implementation.

FIG. 22 shows a flowchart of an example method for measuring displacement of the test probe 102, as shown in block 244 of FIG. 20, according to an example implementation. At block 252, functions include measuring changes in applied force of the test probe 102.

Figure 23:
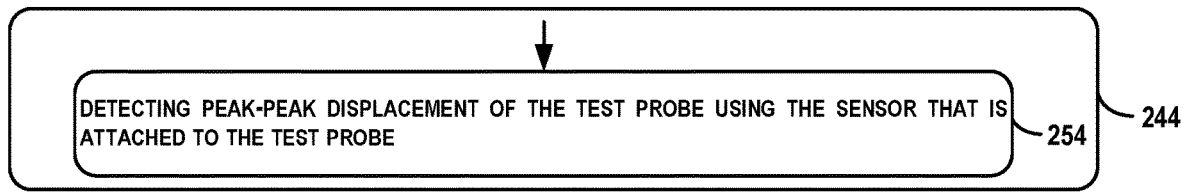
FIG. 23 shows a flowchart of an example method for measuring displacement of the test probe, as shown in FIG. 20, according to an example implementation.

FIG. 23 shows a flowchart of an example method for measuring displacement of the test probe 102, as shown in block 244 of FIG. 20, according to an example implementation. At block 254, functions include detecting peak-peak displacement of the test probe 102 using the sensor 108 that is attached to the test probe 102.

Examples described herein further provide technological improvements that are particular to solving issues of measuring sizes, dimensional measurements, or characteristics of holes or other artifacts in structures. This can address technical problems, such as streamlining certification or testing processes during manufacturing. The systems and methods described herein can be integrated into automated in-situ robotic inspection processes as well.

Thus, use of macro vibration and physical contact to test the size of a hole are described. The systems and methods described herein are less prone to wear than existing methods and do not require dis-assembly if contaminated with, for example, wet sealant. The cleaning process would therefore be quicker and not require a significant down time of the hole measuring process. For example, during the manufacturing process, wet sealant is used and can inadvertently get into the holes that are being measured. If contaminated, the test probe 102 can simply be dipped into a cleaning tank while in vibration to clean the test probe 102.

By the term "substantially", "about", and "approximately" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method to test a size of a hole, the method comprising:
   causing a test probe to vibrate and contact multiple portions of an edge of the hole for a testing cycle when the test probe is inserted into the hole;
   measuring displacement of the test probe, by a sensor coupled to the test probe, as the test probe makes contact with the multiple portions of the edge of the hole, wherein the sensor includes an accelerometer, and wherein measuring displacement of the test probe includes determining a root mean square (RMS) signal that is a function of a proportion of time that the test probe is in free vibration versus a proportion of time that the test probe is in contact with the multiple portions of the edge of the hole and measuring changes in acceleration of the test probe;
   estimating a measurement of the size of the hole based on the displacement of the test probe and reference to calibrated measurements of reference holes; and
   outputting a notification indicative of an estimation of the measurement.

2. The method of claim 1, wherein measuring the displacement of the test probe comprises:
   detecting peak-peak displacement of the test probe using the sensor that is attached to the test probe.

3. The method of claim 1, wherein outputting the notification indicative of the estimation of the measurement comprises outputting the notification indicative of whether the size of the hole is in compliance with a hole size requirement.

4. The method of claim 1, wherein outputting the notification indicative of the estimation of the measurement comprises outputting the notification indicative of whether a roundness of the hole is in compliance with a hole size requirement.

5. The method of claim 1, wherein outputting the notification indicative of the estimation of the measurement comprises outputting the notification indicative of a value of a diameter of the hole.

6. The method of claim 1, wherein outputting the notification indicative of the estimation of the measurement comprises outputting the notification indicative of a value of a roundness of the hole.

7. The method of claim 1, further comprising:
   causing the test probe to rotate as the test probe vibrates and contacts multiple portions of the edge of the hole for the testing cycle when the test probe is inserted into the hole.

8. The method of claim 1, further comprising:
   measuring displacement of the test probe for the testing cycle within at least two holes having known diameter;
   generating a relationship between outputs of the sensor and diameter of the at least two holes; and
   wherein estimating the measurement of the size of the hole based on the output of the sensor and reference to calibrated measurements of reference holes comprises:
   characterizing the output of the sensor in terms of a diameter of the hole via interpolation using the relationship between outputs of the sensor and diameter of the at least two holes.

9. The method of claim 1, further comprising:
   setting an amplitude or frequency of a drive signal to the test probe to change a peak-peak displacement of the test probe.

10. The method of claim 1, further comprising:
    causing the test probe to vibrate in open air prior to insertion into the hole;
    measuring displacement of the test probe, by the sensor coupled to the test probe, in the open air to obtain an open air measurement;
    comparing the open air measurement to a stored open air measurement; and
    based on a variation of the open air measurement as compared to the stored open air measurement being outside of a stored range, outputting a notification indicative of a problem with the test probe.

11. A system to test a size of a hole, the system comprising:
    a test probe;
    a vibration device coupled to the test probe, wherein the vibration device is configured to vibrate the test probe to cause the test probe to contact multiple portions of an edge of the hole for a testing cycle when the test probe is inserted into the hole;
    a sensor coupled to the test probe to measure displacement of the test probe as the test probe makes contact with the multiple portions of the edge of the hole, wherein the sensor includes a force sensor; and
    a computing device having one or more processors and memory storing instructions executable by the one or more processors to perform functions including:
      based on outputs from the sensor, determining displacement of the test probe by determining a root mean square (RMS) signal that is a function of a proportion of time that the test probe is in free vibration versus a proportion of time that the test probe is in contact with the multiple portions of the edge of the hole and measuring changes in applied force of the test probe;
      estimating a measurement of the size of the hole based on the displacement of the test probe and reference to calibrated measurements of reference holes; and
      outputting a notification indicative of an estimation of the measurement.

12. The system of claim 11, further comprising:
    a display coupled to the computing device, wherein the display receives the notification and displays information of the notification.

13. The system of claim 11, wherein the test probe includes a tapered tip.

14. The system of claim 13, further comprising:
    a check hole device positioned in line with the hole under test, wherein the test probe is inserted through the check hole device and the tapered tip reaches the hole under test, wherein the one or more processors further perform functions including:
  determining a check measurement of the check hole, based on outputs of the sensor;
  based on the check measurement exceeding a specified threshold, outputting a notification indicative of a requirement for a recalibration of the test probe.

15. A method to test a size of a hole, the method comprising:
  causing a test probe to vibrate in open air prior to insertion into the hole;
  measuring displacement of the test probe, by a sensor coupled to the test probe, in the open air to obtain an open air measurement;
  comparing the open air measurement to a stored open air measurement;
  based on a variation of the open air measurement as compared to the stored open air measurement being outside of a stored range, outputting a notification indicative of a problem with the test probe;
  causing the test probe to vibrate and contact multiple portions of an edge of the hole for a testing cycle when the test probe is inserted into the hole;
  measuring displacement of the test probe, by the sensor coupled to the test probe, as the test probe makes contact with the multiple portions of the edge of the hole;
  estimating a measurement of the size of the hole based on the displacement of the test probe and reference to calibrated measurements of reference holes; and
  outputting a notification indicative of an estimation of the measurement.

16. The method of claim 15, further comprising:
  causing the test probe to rotate as the test probe vibrates and contacts multiple portions of the edge of the hole for the testing cycle when the test probe is inserted into the hole.

17. The method of claim 15, wherein the sensor includes an accelerometer, and wherein measuring displacement of the test probe comprises measuring changes in acceleration of the test probe.

18. The method of claim 15, wherein the sensor includes a force sensor, and wherein measuring displacement of the test probe comprises measuring changes in applied force of the test probe.

19. The method of claim 15, wherein measuring the displacement of the test probe comprises:
  detecting peak-peak displacement of the test probe using the sensor that is attached to the test probe.

20. The method of claim 15, further comprising:
  setting an amplitude or frequency of a drive signal to the test probe to change a peak-peak displacement of the test probe.

* * * * *